(No Model.)
R. P. WHITE.
REGULATING SPRAYER OR SPRINKLER.
No. 581,874.  Patented May 4, 1897.
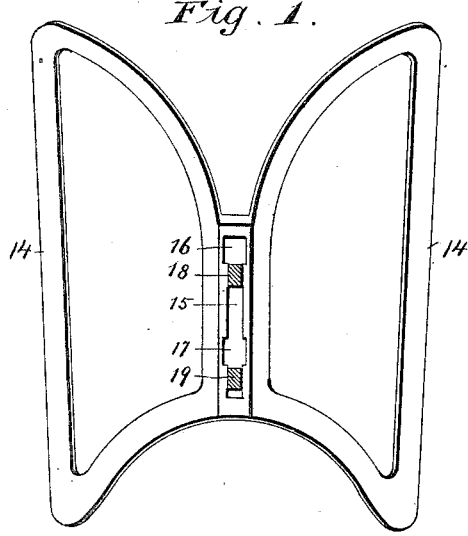
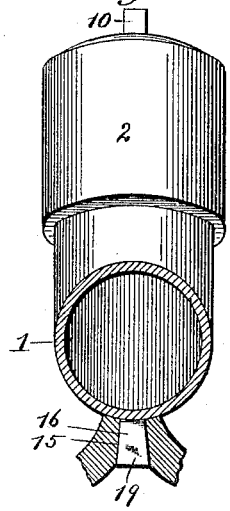
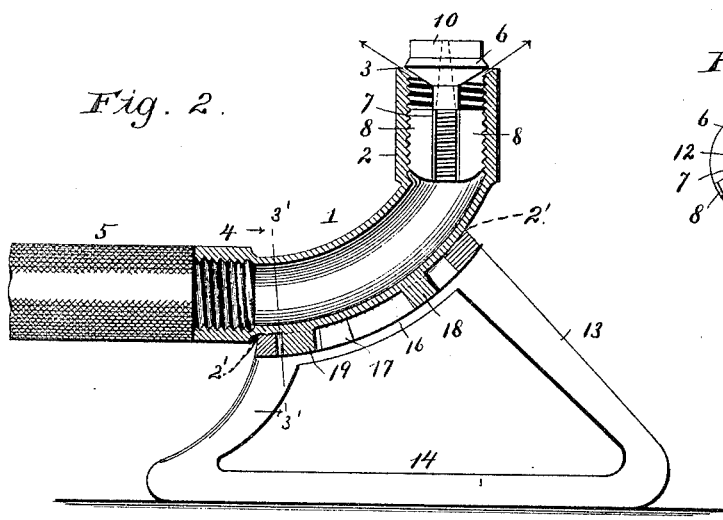
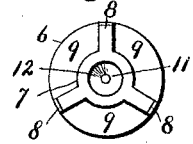
WITNESSES:
F. G. Fischer
G. Y. Thorpe
INVENTOR:
R. P. White
BY Higdon & Higdon
ATTYS.

United States Patent Office.

RALIEGH P. WHITE, OF KANSAS CITY, MISSOURI, ASSIGNOR TO JAMES K. THOMPSON, OF SAME PLACE.

REGULATING SPRAYER OR SPRINKLER.

SPECIFICATION forming part of Letters Patent No. 581,874, dated May 4, 1897.

Application filed January 7, 1896. Serial No. 574,591. (No model.)

*To all whom it may concern:*

Be it known that I, RALIEGH P. WHITE, of Kansas City, Jackson county, Missouri, have invented certain new and useful Improvements in Regulating Sprayers or Sprinklers, of which the following is a full, clear, and exact description, reference being had to the accompanying drawings, forming a part thereof.

My invention relates to water sprayers or sprinklers to be attached to a suitable hose for lawn-sprinkling or other purposes; and my object is to produce a device of this character which may be adjusted or regulated to discharge the water in the form of continuous sheets, in "rain drops," or in the form of a mist or spray.

A further object is to provide a sprinkler or sprayer with a detachable shoe, whereby the device may be stationed on any part of the lawn and the water discharged in a vertical direction without requiring special attention, or may be detached from the shoe and manipulated in the ordinary way of lawn-sprinkling.

A still further object of the invention is to produce a device simple, strong, and inexpensive of construction.

With these objects in view the invention consists in certain novel and peculiar features of construction and combinations of parts, as will be hereinafter described and claimed.

In order that the invention may be fully understood, I will proceed to describe it with reference to the accompanying drawings, in which—

Figure 1 is a section taken on the line 2' 2' of Fig. 2. Fig. 2 is a vertical longitudinal section of my improved water spraying and sprinkling device. Fig. 3 is a section, on an enlarged scale, taken on the line 3' 3' of Fig. 2. Fig. 4 is an inverted plan view of the valve for controlling the passage of water through the device.

In the said drawings, 1 designates an approximately quadrant-shaped pipe, which terminates at its upper end in the vertical internally-threaded nozzle 2, formed with a beveled valve-seat 3 at its upper end, and with an internally-threaded coupling 4 at its opposite end, to which may be coupled in the customary manner the outer end of the hose 5, a section of which is shown.

6 designates a conical valve, which is provided with a stem 7 and with arms 8 radiating outward from said stem, so as to form the interposed waterways 9. The outer edges of said arms 8 are screw-threaded and engage the internal threads of the nozzle 2. At its upper end the valve is provided with a rectangular head or projection 10, which may be grasped by the hand or with a wrench in order to screw the valve down upon or away from its seat. The stem 7 is provided with a longitudinal passage 11, which converges at its upper end to form the small aperture or perforation 12 in the rectangular cross-piece 10 and through which the water under pressure escapes in an exceedingly thin stream. When the valve is nearly touching its seat 3, the water is deflected upwardly and outwardly by direct pressure from the upwardly and outwardly flaring conical surface of the valve in the form of a continuous mist-spray, which will be found of great advantage in watering delicate flowers or plants. When it is adjusted a little farther from its seat, the water is deflected by the valve upwardly and outwardly and falls in a shower of raindrops, and when it is adjusted sufficiently far from its seat (the distance being regulated or determined by the water-pressure) the water escapes upwardly and outwardly in a continuous sheet.

The device may be held in the hand, but preferably is mounted upon a cast shoe 13, which comprises the upwardly-converging skeleton wings or runners 14, united at their upper ends by the longitudinal bridge portion 15. Said bridge portion is provided with a longitudinal slot 16, which tapers rearwardly. At a suitable distance from its rear end the slot is widened, as shown at 17. The wide front end of the slot 16 and the enlarged portion 17 are adapted to receive the wedge-shaped tenons 18 and 19, projecting from the under side of the quadrant-shaped pipe. To make the connection between said pipe and the shoe secure, the pipe is moved rearwardly to cause said tenons to move rearwardly toward the narrow end of the slot, wherein they become tightly wedged, so that by grasping the hose at a suitable point the sprayer or sprinkler may be drawn to any part of the lawn without the operator coming within reach of or cutting off the water. It will also be noticed in this connection that there will be no possible chance of the pipe becoming disconnected from the shoe, owing to the fact that the tendency of the tenons 18 and 19 will be to become more tightly wedged into the slot. To prevent any possible chance of the pipe being lifted out of connection with the shoe or the shoe dropping from the pipe if the latter be raised, the connection between said slot and said tenons will preferably be in the form of a dovetail, so that only when said tenons register with the enlarged portions of the slot can the parts be disengaged.

It is to be understood, of course, while I have described a particular means for connecting the pipe and the shoe that I do not wish to confine myself to this precise construction, but wish to cover any equivalent means for accomplishing the same object.

From the above description it will be apparent that I have produced a regulating direct-pressure spray or sprinkler which will be found to possess decided advantages over analogous devices in point of efficiency, strength, convenience, and cheapness.

Having thus described the invention, what I claim as new, and desire to secure by Letters Patent, is—

1. A water sprayer or sprinkler, comprising a quadrant-shaped pipe for attachment at its lower end to a hose, and internally threaded at its upper end, a conical valve provided with a stem which projects into the upper end of the pipe and is provided with radial screw-threaded arms, which engage the internal threads of the said upper end, and an angular head or cross-bar projecting upwardly from the valve to form a handle to be grasped by one's hand or by a wrench, substantially as and for the purpose set forth.

2. A water sprayer or sprinkler, comprising a quadrant-shaped pipe for attachment to a hose at one end, and internally threaded at its opposite end, and formed also with a beveled or flaring seat at its upper end, and a valve provided with a longitudinal stem, with an angular head or cross-bar, and with a vertical bore or channel, which tapers to a small orifice at its upper end, and ribs projecting radially from said stem and threaded to engage the internal threads of the upper end of the pipe, substantially as set forth.

3. A water sprayer or sprinkler, comprising a quadrant-shaped pipe for attachment to a hose at one end and internally screw-threaded at its opposite end, a conical valve having a stem adjustably mounted in said threaded end, tenons projecting from said pipe, and a shoe provided with a tapering slot, in which said tenons engage, substantially as set forth.

4. A water sprayer or sprinkler, comprising a quadrant-shaped pipe for attachment to a hose at one end, and provided with a regulating-valve at its opposite or upper end, and with tenons projecting from its under side, of a shoe, provided with a tapering slot and enlarged at a suitable point; said tenons and slot forming a dovetail connection, whereby they cannot become accidentally disengaged, substantially as set forth.

In testimony whereof I affix my signature in presence of two witnesses.

RALIEGH P. WHITE.

Witnesses:
M. R. REMLEY,
G. Y. THORPE.